United States Patent
Masterson

(10) Patent No.: US 8,872,856 B1
(45) Date of Patent: Oct. 28, 2014

(54) MACROBLOCK BASED SCALING OF IMAGES USING REDUCED MEMORY BANDWIDTH

(75) Inventor: Anthony D. Masterson, Saratoga, CA (US)

(73) Assignee: Zenverge, Inc., Santa Clara, CA (US)

( * ) Notice: Subject to any disclaimer, the term of this patent is extended or adjusted under 35 U.S.C. 154(b) by 1254 days.

(21) Appl. No.: 12/534,758

(22) Filed: Aug. 3, 2009

Related U.S. Application Data

(60) Provisional application No. 61/088,956, filed on Aug. 14, 2008.

(51) Int. Cl.
*G09G 5/00* (2006.01)
*G06T 3/40* (2006.01)

(52) U.S. Cl.
CPC .......... *G06T 3/40* (2013.01); *G06G 2340/0414* (2013.01); *G06T 3/4007* (2013.01); *G09G 2340/0407* (2013.01); *G06T 3/4023* (2013.01)
USPC ........... 345/660; 345/666; 345/667; 345/670; 345/671

(58) Field of Classification Search
None
See application file for complete search history.

(56) References Cited

U.S. PATENT DOCUMENTS

| | | | |
|---|---|---|---|
| 6,587,602 B2 * | 7/2003 | Wakisawa et al. | 382/298 |
| 6,611,260 B1 * | 8/2003 | Greenberg et al. | 345/204 |
| 2001/0043282 A1 * | 11/2001 | Hu | 348/453 |
| 2003/0072284 A1 * | 4/2003 | Webster et al. | 370/335 |
| 2005/0134731 A1 * | 6/2005 | Lee et al. | 348/458 |
| 2005/0140697 A1 * | 6/2005 | Chen | 345/660 |
| 2006/0044388 A1 * | 3/2006 | Kim et al. | 348/42 |
| 2006/0165164 A1 * | 7/2006 | Kwan et al. | 375/240.03 |
| 2006/0176952 A1 * | 8/2006 | Zeng | 375/240.2 |
| 2007/0065800 A1 * | 3/2007 | Yang et al. | 434/428 |
| 2007/0104394 A1 * | 5/2007 | Chou | 382/300 |
| 2007/0110337 A1 * | 5/2007 | Lai | 382/300 |
| 2008/0001970 A1 * | 1/2008 | Herrick et al. | 345/634 |
| 2010/0172599 A1 * | 7/2010 | Choi | 382/298 |

* cited by examiner

*Primary Examiner* — Jwalant Amin
(74) *Attorney, Agent, or Firm* — Fenwick & West LLP

(57) ABSTRACT

A method and/or system of scaling images by providing a horizontal macroblock scaler with pixels of the images in units of macroblocks and a vertical macroblock scaler where the pixels of the output image are in units of macroblocks. For the horizontal macroblock scaler macroblocks decoded or vertically scaled are read into the horizontal scaler to generate horizontally scaled macroblocks of pixels. The horizontal scaler need not access data stored in a memory, which reduces the memory bandwidth need for scaling the image. For the vertical macroblock scaler macroblocks decoded or horizontally scaled are read into the vertical scaler from memory to generate vertical scaled macroblocks of pixel. The output of the vertical scaler can be sent directly to an encoder without going through memory first, which reduces the memory bandwidth need for scaling the image. A transcoder parameter may also be provided to scale transcoder parameters such as quantization step sizes and motion vectors that are received from the decoder. The scaled transcoder parameters may be fed to an encoder or a transcoder to encode or transcode the scaled images without motion estimation that is computationally expensive.

19 Claims, 14 Drawing Sheets

Non-MBAFF

| | MB (M) | MB (M+1) | MB (M+2) | |
|---|---|---|---|---|
| ••• | | | | ••• |
| ••• | MB (N) | MB (N+1) | MB (N+2) | ••• |

FIG. 5A

MBAFF

| | | MB | MB | MB | |
|---|---|---|---|---|---|
| Up (Odd) | ••• | MB (M) | MB (M+2) | MB (M+4) | ••• |
| Down (Even) | ••• | MB (M+1) | MB (M+3) | MB (M+5) | ••• |
| Up (Odd) | ••• | MB (N) | MB (N+2) | MB (N+4) | ••• |
| Down (Even) | ••• | MB (N+1) | MB (N+3) | MB (N+5) | ••• |

FIG. 5B

MACROBLOCK BASED SCALING OF IMAGES USING REDUCED MEMORY BANDWIDTH

CROSS-REFERENCE TO RELATED APPLICATION

This application claims priority under 35 U.S.C. §119(e) to U.S. Provisional Patent Application No. 61/088,956 entitled "Macroblock Based Scaling of Images Using Reduced Memory Bandwidth," filed on Aug. 14, 2008, which is incorporated by reference herein in its entirety.

BACKGROUND

1. Field of Art

The disclosure relates generally to a method and/or system of scaling images for display, and more specifically, to a method and/or system for upscaling or downscaling images with reduced memory bandwidth requirement.

2. Description of Related Art

Different devices display images of different resolutions. Therefore, an image adapted for one device may not be displayed on another device compatible with a different resolution. To display the same image on display devices compatible with different resolutions, the image must be scaled. That is, if the original image is too small for display on the display device, the original image must be upscaled to a larger image with more pixels than the original image. Conversely, if the original image is too large to be displayed on the display device, the original image must be downscaled to a smaller image with fewer pixels than the original image.

The scaling often requires two separate scaling processes: horizontal scaling and vertical scaling. The horizontal scaling changes the image width (x-direction) of the image. The vertical scaling, on the other hand, changes the image height (y-direction) of the image. Generally, the horizontal scaling is followed by the vertical scaling during a downscaling process. On the contrary, the vertical scaling is followed by the horizontal scaling during an upscaling process in order to save memory bandwidth for the vertical scaler.

Such scaling process, however, requires high memory bandwidth. In conventional methods, the images scaled in vertical (or horizontal) direction by a vertical (or horizontal) scaler are stored in the memory and then retrieved from the memory for horizontal (or vertical) scaling by a horizontal (or vertical) scaler. These processes of storing and retrieving the images consume a large amount of memory bandwidth. Therefore, the memory bandwidth may serve as a limiting factor in increasing the speed of scaling or other related processes.

The scaling of images are sometimes performed as part of transcoding process during which images compressed in one format are converted to images in another format. The transcoding of images, however, often also requires high memory bandwidth. The transcoding process includes encoding or decoding processes in addition to the scaling process that also require access to the memory. Access to memory during such transcoding process may become a bottleneck that slows down the overall transcoding process. Therefore, it is crucial that the required memory bandwidth be reduced in the scaling process to save the memory bandwidth for other transcoding processes.

Compressed images are typically processed in macroblocks that consist of a horizontal and vertical array of pixels. The macroblocks make it difficult to scale the decompressed image unless the image is written out to memory. After writing out the macroblocks to the memory, a traditional pixel-based scaler is used to scale pixels in the horizontal and vertical direction.

SUMMARY

The disclosed embodiments include an example embodiment in which a first scaler (e.g., a horizontal macroblock scaler) receives first pixel data for two or more macroblocks of an image for scaling. The first scaler then generates second pixel data by providing the pixel data for a plurality of pixels spanning across the two or more macroblocks as inputs of a scaling filter. A scaled image is then generated based on the second pixel data.

In one embodiment, the first scaler receives the first pixel data from a decoder or a second scaler (e.g., vertical macroblock scaler). The second scaler scales the image in a second direction (e.g., vertically). The first scaler does not access the memory to retrieve the pixel data for scaling. Therefore, the memory bandwidth necessary for performing the scaling is reduced, allowing scaling or other processes to be performed at a higher speed.

In one embodiment, transcoder parameters received from a decoder are converted or duplicated and are then fed to the encoder. The encoder may convert version of the transcoder parameters instead of performing separate processes to obtain the transcoder parameters. Therefore, the encoder may encode the scaled macroblocks more efficiently.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

FIG. 5A is a diagram illustrating macroblocks arranged in a non-MBAFF format, according to one embodiment.

FIG. 5B is a diagram illustrating macroblocks arranged in a MBAFF format, according to one embodiment.

DETAILED DESCRIPTION

Figure 1:
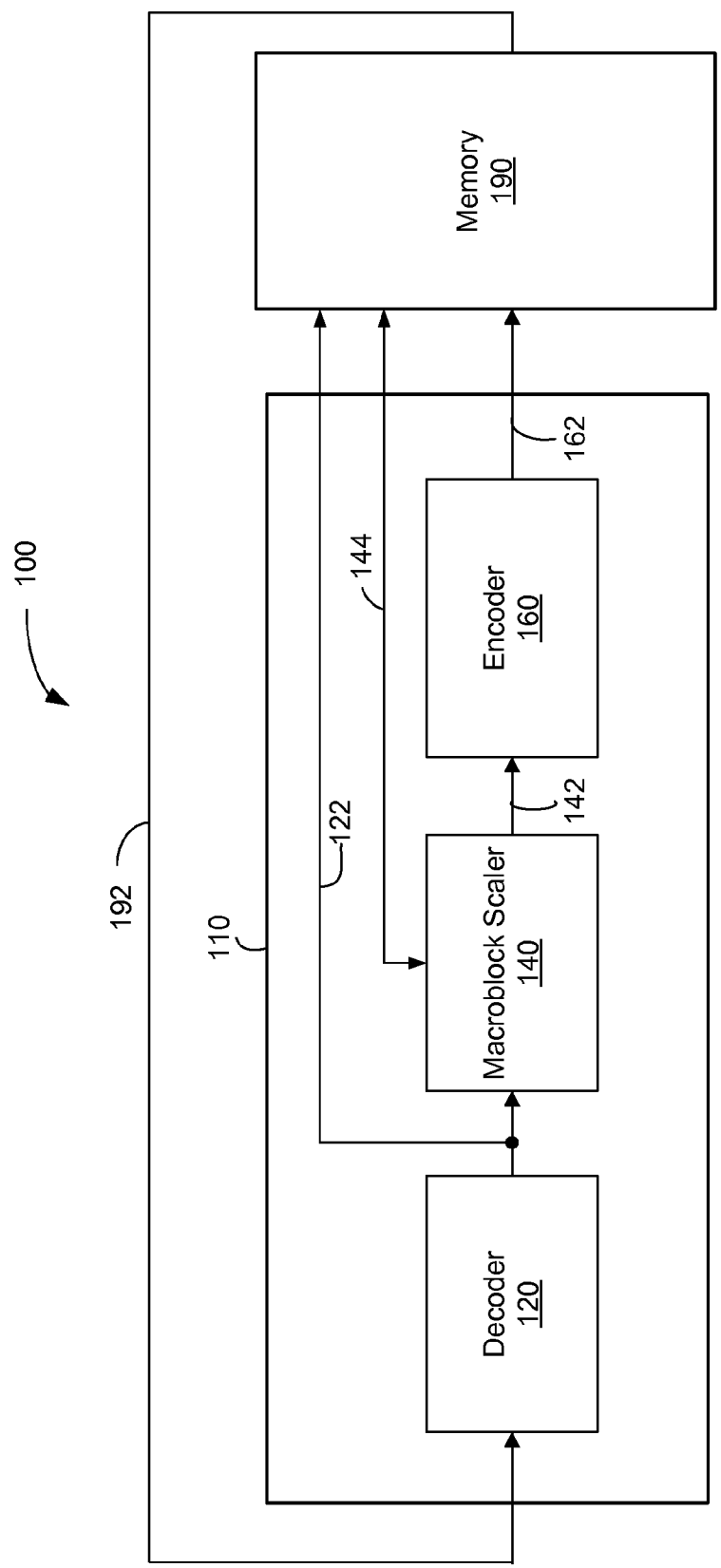
FIG. 1 is a schematic block diagram illustrating a transcoding system according to one embodiment.

The embodiments described herein will be with reference to the accompanying drawings where feasible, like reference numerals are used for like elements in the accompanying drawings.

Pixel data refer to data associated with colors of pixels in an image. The pixel data may indicate different information depending on the color space used in representing the image. For example, in images using YUV color model, the pixel data indicate luma and/or chroma of each pixel. Further, the pixel data may indicate different color information depending on the macroblock that is being scaled. For example, the pixel data represent chroma values in chroma macroblocks and luma values in luma macroblocks.

Transcoder parameters refer to parameters that are generated during decoding of images. The transcoder parameters may include, among others, motion vectors, macroblock location, new slice flag, CBP (Coded Block Pattern) value, DCT (Discrete Cosine Transform) type, field/frame flag, intra flag, macroblock type, and quantization values. The transcoder parameters may be extracted during the decoding process.

Overview of the Architecture

In embodiments described herein, images are horizontally scaled by providing macroblocks of the images as a unit to a horizontal macroblock scaler. The macroblocks decoded (by a decoder) or vertically scaled (by a vertical macroblock scaler) are read into the horizontal macroblock scaler to generate horizontally scaled blocks of pixels. The horizontal macroblock scaler need not access data stored in a memory, which reduces the memory bandwidth need for scaling the image because the horizontal macroblock scaler processes entire macroblocks of pixels rather than the traditional approach of processing single lines of pixels. Similarly, the output of the vertical macroblock scaler include macroblocks that can be passed directly to the encoder, which reduces the memory bandwidth because the vertical scaler processes entire macroblocks of pixels rather than the traditional approach of processing single lines of pixels. A transcoder parameter scaler may also be provided to scale transcoder parameters received from the decoder. The scaled transcoder parameters may be fed to an encoder or a transcoder to encode or transcode the scaled images which reduces or eliminates the need for motion estimation that is computationally expensive.

FIG. 1 is a schematic block diagram illustrating a transcoding system 100 according to one embodiment. The transcoding system 100 may include, among other components, a media processor 110 and a memory 190. The media processor 110 and the memory 190 communicate via a bus (not illustrated). The memory 190 has a limited memory bandwidth, and may be shared with other devices or system. The media processor 110 performs transcoding of images by reading input image data 192 compressed in one format (e.g., MPEG-2 format) and outputting converted image data 162 in another format (e.g., H.264 format).

The transcoding process is a computation intensive process that requires high memory bandwidth between the media processor 110 and the memory 190. The bandwidth requirement sometimes becomes a limiting factor in designing a fast and efficient transcoding system 100. Further, the memory bandwidth may need to be preserved to allow performing of other processes that also require access to the memory 190.

The media processor 110 may include, among other components, a decoder 120, a macroblock scaler 140, and an encoder 160. The decoder 120 reads compressed image data 192 from the memory 190 and outputs decoded macroblocks 122. The decoded macroblock 122 may be provided to the macroblock scaler 140 or to the memory 190 depending on the type of scaling that is being performed by the macroblock scaler 140. In one embodiment, the decoder 120 outputs the decoded macroblocks 122 to the macroblock scaler 140 when downscaling the image at the macroblock scaler 140. Conversely, the decoder 120 outputs the decoded macroblock 122 to the memory 190 when upscaling the image at the macroblock scaler 140. Although the macroblock scaler 140 is described herein as a component of the media processor 110, the use of scaler is not limited to the media processor 110. For example, the macroblock scaler 140 may be a separate component provided on a display device or part of other image processing systems. For added flexibility, the decoded macroblocks 122 to the Macroblock Scaler 140 may come from the memory 190 and the scaled image 142 from the macroblock scaler 140 can go directly to the memory 190.

The macroblock scaler 140 is coupled between the decoder 120 and the encoder 160. The macroblock scaler 140 also communicates with the memory 190 to send or receive pixel data 144 to vertically scale the image, as described below with reference to FIGS. 6B and 8. The macroblock scaler 140 is responsible for upscaling or downscaling the images, as described below in detail with reference to FIG. 2.

The encoder 160 is coupled to the macroblock scaler 140 and the memory 190. The encoder 160 receives macroblocks of scaled images 142 from the macroblock scaler 140, and encodes the scaled images 142. In one embodiment, the decoder 120 further provides transcoder parameters associated with the macroblock to the scaler 140. The scaler 140 scales the transcoder parameters and outputs the scaled transcoder parameters to the encoder 160. The encoder 160 may then use the scaled transcoder parameters to encode the macroblocks of the scaled image instead of generating new transcoder parameters. The transcoder parameters may include, among others, quantization values, macroblock location, new slice flag, CBP (Coded Block Pattern) value, DCT (Discrete Cosine Transform) type, field/frame flag, intra flag, macroblock type and motion vectors. By providing the scaled transcoder parameters to the encoder 160, the encoding process can be expedited because the separate process of computing the transcoder parameters for encoding need not be performed at the encoder 160. After the macroblocks from the scaler 140 are encoded, the encoder 160 then stores the encoded data 162 in the memory 190.

The memory 190 may store, among other data, the compressed streams and images to be processed by the media processor 110. In one embodiment, the memory 190 is implemented by, for example, a double-data-rate two synchronous dynamic random access memory (DDR2 SDRAM). The memory 190 may be coupled to other modules or devices (not shown) to receive and store various types of data.

Architecture of Scaler

Figure 2:
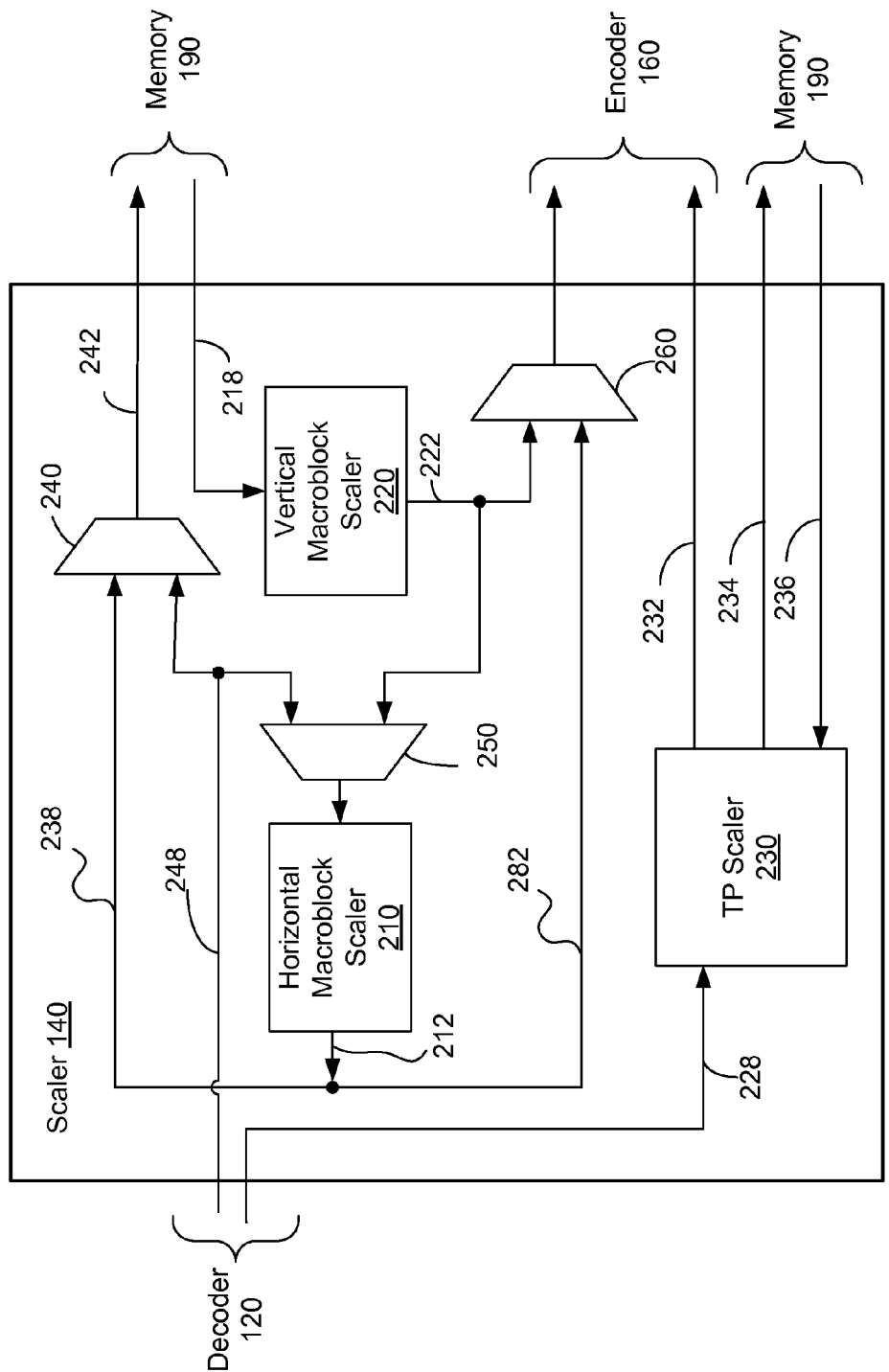
FIG. 2 is a block diagram of a scaler according to one embodiment.

FIG. 2 is a block diagram illustrating the macroblock scaler 140, according to one embodiment. The scaler 140 may include, among other components, a horizontal macroblock scaler 210, a vertical macroblock scaler 220, a transcoder parameter (TP) scaler 230, and three multiplexers 240, 250, 260. The horizontal macroblock scaler 210 scales a block of pixels horizontally while the vertical macroblock scaler 220 scales a block of pixels vertically, as described below in detail with reference to FIGS. 3A and 3B. The TP scaler 230 receives the decoded transcoder parameter 228 from the decoder 120 and outputs a scaled transcoder parameter 232, as described below in detail with reference to FIG. 4. Each component of the scaler 140, whether alone or in combination with other components, may be implemented for example, in software, hardware, firmware or any other combination thereof.

The multiplexers 240, 250, 260 switch data buses between the components of the macroblock scaler 140, the decoder 120, the memory 190, and the encoder 160 depending on the mode of the macroblock scaler 140 to forward adequate data to these components of the transcoding system 100. Specifically, the multiplexers 240, 250, 260 routes the data depending on whether the macroblock scaler 140 is performing (i) only horizontal macroblock scaling, (ii) downscaling of the images, or (iii) upscaling of the images.

When performing horizontal macroblock scaling only (i), the decoded macroblocks 122 are fed to the multiplexer 250 via a bus 248. The multiplexer 250 then forwards the data for the decoded macroblocks 122 to the horizontal macroblock scaler 210. After the horizontal macroblock scaler 210 scales the macroblocks 122 horizontally, the pixel data 212 for the horizontally scaled blocks of pixels are sent to the multiplexer 260 via a bus 282. The multiplexer 260 then transmits the pixel data for the scaled blocks of pixels to the encoder 160.

When performing downscaling of the images (ii), the image is first horizontally scaled and then vertical scaled. The reason for horizontally scaling first when downscaling is to reduce the amount of data written to and read from the memory 190 for the vertical macroblock scaling. First, the data 122 for the decoded macroblocks are fed to the horizontal scaler 210 via the bus 248 and the multiplexer 250. The horizontally scaled blocks of pixel data 212 are then sent to the memory 190 via a bus 238, the multiplexer 240 and a bus 242 for storage. The pixel data stored in the memory 190 are then read into the vertical macroblock scaler 220 via a bus 218. Specifically, the vertical macroblock scaler 220 reads the pixel data for a block of pixels having a predetermined size adequate for generating the downscaled macroblock, as described below in detail with reference to FIG. 6B. The data of vertically and horizontally scaled macroblocks are then sent to the encoder 160 via a bus 222 and the multiplexer 260.

When performing upscaling of the images (iii), the sequence of performing the scaling is opposite to the downscaling process. That is, the vertical scaling is performed first followed by the horizontal scaling. Performing vertical scaling before the horizontal scaling is advantageous, among other reasons, because the memory bandwidth for scaling can be reduced because the output of both the horizontal and vertical macroblock scalers is larger than the input for upscaling. For upscaling, the pixel data 122 for the decoded macroblocks are first stored in the memory 190 via the bus 248, the bus 242 and the multiplexer 240. Then, the vertical macroblock scaler 220 retrieves pixel data for a block of pixels having a predetermined size from the memory 190 via a bus 218. The vertical macroblock scaler 220 then sends the data of the vertically scaled image to the horizontal scaler 210 via the bus 222 and the multiplexer 250. In one embodiment, the pixel data retrieved by the vertical scaler 220 in a single memory access burst is adequate to generate a 16×16 pixels sized output macroblock. In another embodiment, the pixel data retrieved by the vertical scaler 220 in a cycle is sufficient to generate a macroblock having a different size (e.g., 8×16 pixels sized macroblock), for example, when scaling chroma macroblocks. The horizontal macroblock scaler 210 receives the data from the multiplexer 250 and then outputs pixel data 212 for the vertically and horizontally scaled output macroblock to the multiplexer 260. The multiplexer 260 then sends the pixel data 212 to the encoder 160 for encoding.

The TP scaler 230 receives the transcoder parameters 228 from the decoder 120. The TP scaler 230 then scales the transcoder parameter 228 and sends the scaled transcoder parameter 232 to the encoder 160, as described below in detail with reference to FIG. 4.

In one embodiment, the macroblock scaler 140 receives external commands from software running on a processor (not shown). In one embodiment, the external commands indicate various information, among others, information indicating whether the original images are in a MBAFF (MacroBlock Adaptive Frame/Field) format or a non-MBAFF format, and information indicating whether the original images are progressive or interlaced. The horizontal macroblock scaler 210, the vertical macroblock scaler 220, and the TP scaler 230 may change their mode of operation based on the information as indicated by the external commands.

Figure 3A:
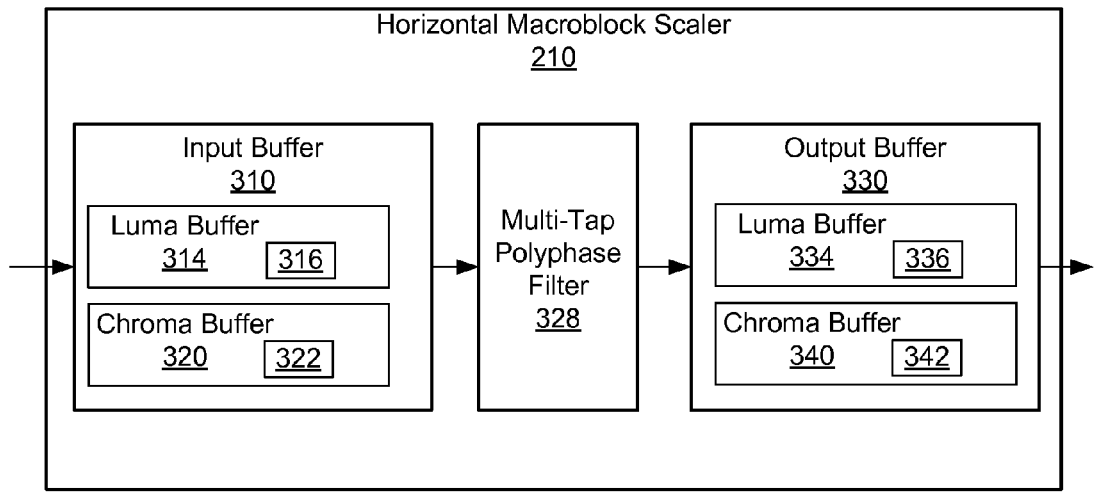
FIG. 3A is a block diagram of a horizontal macroblock scaler according to one embodiment.

FIG. 3A is a block diagram of the horizontal macroblock scaler 210 according to one embodiment. The horizontal macroblock scaler 210 may include, among other components, an input buffer 310, a multi-tap polyphase filter 328, and an output buffer 330. The input buffer 310 includes a luma buffer 314 for storing luma macroblocks and a chroma buffer 320 for storing chroma macroblocks. The data stored in the input luma buffer 314 and the input chroma buffer 320 may have different structures depending on YUV formats (e.g., YUV 4:4:4 and YUV 4:2:0) of the images to be scaled. Each component of the horizontal macroblock scaler 210, whether alone or in combination with other components, can be implemented for example, in software, hardware, firmware or any other combination thereof.

In one embodiment, the input luma buffer 314 includes a luma buffer 316 that stores luma macroblocks. In one embodiment, the luma buffer 316 includes a first input buffer and a second input buffer, as described below with reference to FIG. 6A. Likewise, the input chroma buffer 320 includes a chroma buffer 322 for storing chroma macroblocks. In one embodiment, the chroma buffer 322 includes a first input buffer and a second input buffer.

In one embodiment, the input buffer 310 of the horizontal macroblock scaler 210 is not coupled to the memory 190 to access the pixel data. Instead, the input buffer 310 is coupled to the decoder 120 or the vertical macroblock scaler 220 via the multiplexer 250 to receive the data for the macroblocks directly from the decoder 120 or the vertical scaler 220 without accessing the memory 190. The horizontal scaler 210 processes macroblocks instead of individual lines of pixels. Hence, the memory 190 is not accessed by the horizontal scaler 310 for horizontal scaling and no memory bandwidth is used during the horizontal scaling process. Further, the input buffer 310 receives the pixel data in units of macroblocks as generated by the decoder 120 or the vertical scaler 220. In this way, further image processing (e.g., YUV 4:2:2 to 4:2:0 format conversion) may be performed during the scaling process.

The multi-tap polyphase filter 328 is coupled between the input buffer 310 and the output buffer 330. The multi-tap polyphase filter 350 receives pixel data for multiple pixels from the input buffer 310 and generates one or more pixels that represent a horizontally scaled image. In one embodiment, the multi-tap polyphase filter 328 is a 17-tap polyphase filter. The 17-tap polyphase filter is advantageous, among other reasons, because no pixels in the two horizontally adjacent macroblocks are wasted. That is, by using seventeen (17) pixels for scaling the image, the highest quality horizontal scaling can be obtained from two macroblocks (each having a size of 16×16 pixels) stored in the input buffer 310. Other types of tap filters (e.g., 6-tap filters or 4-tap filter) may also be used. The data for pixels generated by the multi-tap polyphase filter 350 are stored in the output buffer 330. The output buffer 330 is essentially the same as the input buffer 310.

Figure 3B:
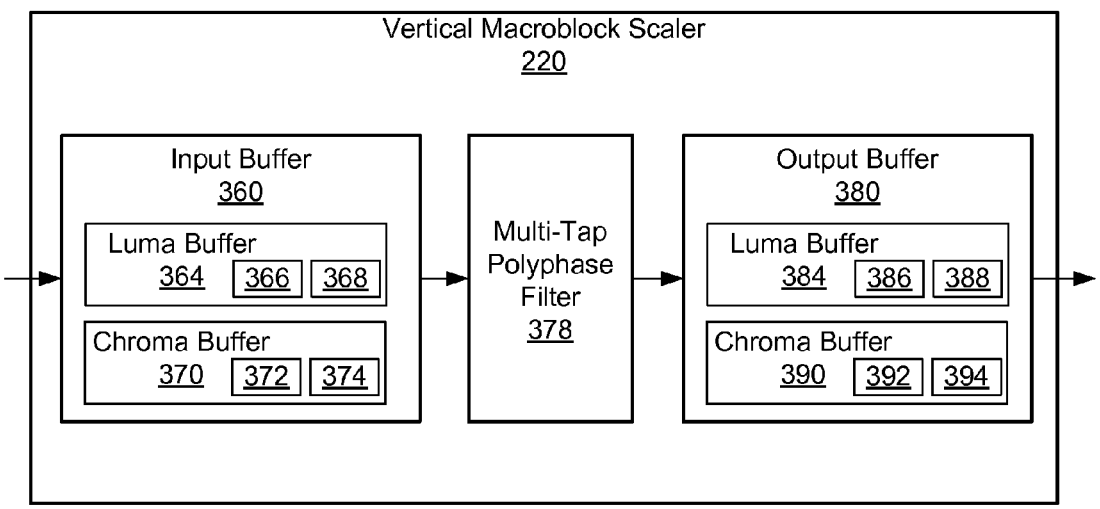
FIG. 3B is a block diagram of a vertical macroblock scaler according to one embodiment.

FIG. 3B is a block diagram illustrating the vertical macroblock scaler 220 according to one embodiment. The components of the vertical scaler 220 are similar to the components of the horizontal scaler 210. Specifically, the vertical scaler 220 may include, among other elements, an input buffer 360, a multi-tap polyphase filter 378, and an output buffer 380. The input buffer 360 receives pixel data of images from the memory 190. In one embodiment, the input buffer 360 stores only an appropriate amount of pixel data necessary for performing the vertical scaling, as described below in detail with reference to FIGS. 6B and 8. The pixel data stored in the input buffer 360 need not be in the units of macroblocks because pixel data at any locations of the image may be retrieved from the memory 190. The input buffer 360 stores data adequate for generating a vertically scaled macroblock by the multi-tap polyphase filter 378 based on the maximum downscale ratio. For example, for a downscale ratio of 8 to 1 and using a 17-tap filter, the luma buffer can contain 137 rows of pixels (15*8+1+16) to generate a single 16×16 output macroblock. Contrast this with the horizontal scaler 210 which receives pixel data of a macroblock as a unit input. Note that because the vertical macroblock scaler 220 produces macroblock rather than pixels like a traditional scaler, its output can be passed to the encoder 160 without being written to the memory 190 which saves a significant amount of bandwidth.

In one embodiment, the input luma buffer 364 includes an odd luma buffer 366 and an even luma buffer 368. The odd luma buffer 366 stores luma pixels including odd lines of interlaced images. The even luma buffer 368 stores luma pixels including even lines of the interlaced images. The pixels stored in the odd luma buffer 366 and the pixels stored in the even luma buffer 368 are scaled separately by the vertical macroblock scaler 220 to prevent feathering of images due to mixing two different fields together. Likewise, the input chroma buffer 370 includes an odd chroma buffer 372 for storing odd line chroma pixels and an even chroma buffer 374 for storing even line chroma pixels.

The multi-tap polyphase filter 378 of the vertical scaler 220 is essentially the same as the multi-tap polyphase filter 328 of the horizontal scaler 210. In one embodiment, the multi-tap polyphase filter 378 is a 17-tap polyphase filter. Other polyphase filters may be used instead of the 17-tap polyphase filter. For example, 4-tap or 6-tap polyphase filter may be used. The memory bandwidth may be reduced by using a filter with fewer taps. But when fewer taps are used, the quality of the scaled image is degraded.

The pixel data for the scaled image generated by the multi-tap polyphase filter 378 are then stored in the output buffer 380. In one embodiment, the output buffer 380 includes an output luma buffer 384 and an output chroma buffer 390. In one embodiment, the output luma buffer 384 has an odd luma buffer 386 and an even luma buffer 388 for storing even line macroblocks and odd line macroblocks of interlaced image, respectively. The output chroma buffer 390 may also include an even chroma buffer 392 and an odd chroma buffer 394.

Figure 4:
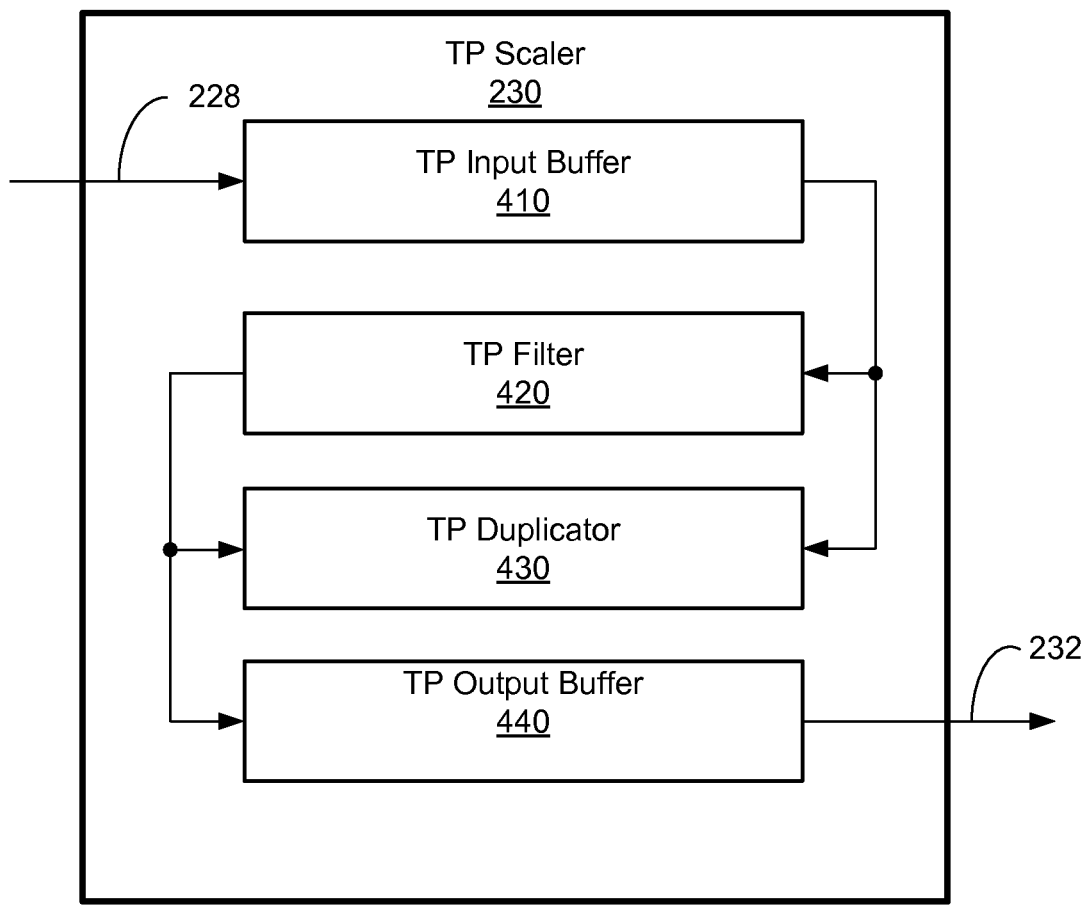
FIG. 4 is a block diagram of a transcoder parameter scaler according to one embodiment.

FIG. 4 is a block diagram illustrating the transcoder parameter scaler 230, according to one embodiment. The TP scaler 230 may include, among other components, a transcoder parameter input buffer 410, a transcoder parameter filter 420, a transcoder parameter duplicator 430, and a transcoder parameter output buffer 440. Each component of the TP scaler 230, whether alone or in combination with other components, can be implemented for example, in software, hardware, firmware or any other combination thereof.

The transcoder parameter input buffer 410 receives and stores the transcoder parameters 228 of the decoded image from the decoder 120. The transcoder parameters stored in the transcoder parameter input buffer 410 are then fed to the transcoder parameter filter 420 or to the transcoder parameter duplicator 430 depending on whether the image is being downscaled or upscaled. Specifically, when the image is being downscaled, the transcoder parameters 228 are fed to the transcoder parameter filter 420. When the image is being upscaled, the transcoder parameters 228 are fed to the transcoder parameter duplicator 430.

The transcoder parameter filter 420 scales the transcoder parameters 228 and outputs the downscaled transcoder parameters 232 to the encoder 160. The transcoder parameter filter 420 scales the transcoder parameters 228 depending on the type of parameter. For example, motion vectors can be filtered using averaging or a median filter. Quantization values can also be filtered by averaging or a median filter. Flags such as the field/frame flag can be combined with logic operations such as AND or OR.

The transcoder parameter duplicator 430 duplicates the transcoder parameters 228 for newly generated blocks of pixels when upscaling the image. The transcoder parameters 228 are duplicated by copying identical values, or by filtering. For example, the motion vectors can be interpolated for the new macroblocks.

The scaled transcoder parameters generated by the transcoder parameter filter 420 or the transcoder parameter duplicator 430 are then output and stored in the transcoder parameter output buffer 440. The scaled transcoder parameters 232 are then sent to the encoder 160.

By providing scaled or duplicated transcoder parameters, the need to perform certain processes (e.g., motion estimation) at the encoder 160 is reduced or eliminated. The process of determining parameters such as motion vectors using motion estimation is a very computationally expensive. Therefore, eliminating or reducing the motion estimation at the encoder 160 greatly enhances the efficiency of the overall transcoding process.

In one embodiment, the macroblocks may be fed the horizontal scaler 210 in the sequence the image is decoded at the decoder 120. FIG. 5A illustrates macroblocks arranged in a non-MBAFF (Macroblock-adaptive frame-field) formatted image. In the non-MBAFF formatted image, the macroblocks are decoded from the left to right, in the order of MB(M), MB(M+1), and MB(M+2). After all the macroblocks in one macroblock row are decoded, the decoding process proceeds to the next row of macroblocks to decode the blocks from left to right, in the order of MB(N), MB(N+1), and MB(N+2).

FIG. 5B illustrates macroblocks arranged in a MBAFF formatted image. In the MBAFF formatted image, sequential macroblocks alternate between two rows of macroblocks in the image creating macroblock pairs consisting of an upper macroblock (MB(M), MB(M+2), MB(M+4), MB(N), MB(N+2), and MB(N+4)) and a lower macroblock (MB(M+1), MB(M+3), MB(M+5), MB(N+1), MB(N+3), and MB(N+5)). MBAFF allows the H.264 compression format to deal with interlaced material more efficiently by allowing the even and odd lines to be grouped into separate macroblocks. Specifically, the two rows of macroblocks are decoded in the order of MB(M), MB(M+1), MB(M+2), MB(M+3), MB(M+4) and MB(M+5). Likewise, the macroblocks in the MBAFF format are fed to the scaler 140 in the order of MB(M), MB(M+1), MB(M+2), MB(M+3), MB(M+4) and MB(M+5).

After the two rows are decoded, the decoding process proceeds to the next two macroblocks, decoding them in the order of MB(N), MB(N+1), MB(N+2), MB(N+3), MB(N+4) and MB(N+5). Likewise, the macroblocks in the MBAFF format are fed to the scaler 140 in the order of MB(N), MB(N+1), MB(N+2), MB(N+3), MB(N+4) and MB(N+5).

Providing the macroblocks to the scaler 140 in the order the macroblocks are decoded at the decoder 120 is advantageous, among other reasons, because the decoded macroblocks need not be stored in the memory 190. That is, the macroblocks may be provided to the horizontal scaler 210 directly without using the memory 190 to rearrange the sequence in which the macroblocks are read into the horizontal scaler 210. This allows the memory bandwidths to be reduced during the scaling process. Similarly, the vertical macroblock scaler 210 can provide scaled macroblocks directly to the encoder 190 without using the memory 190 to rearrange the sequence saving memory bandwidth.

Downscaling Example

Figure 6A:
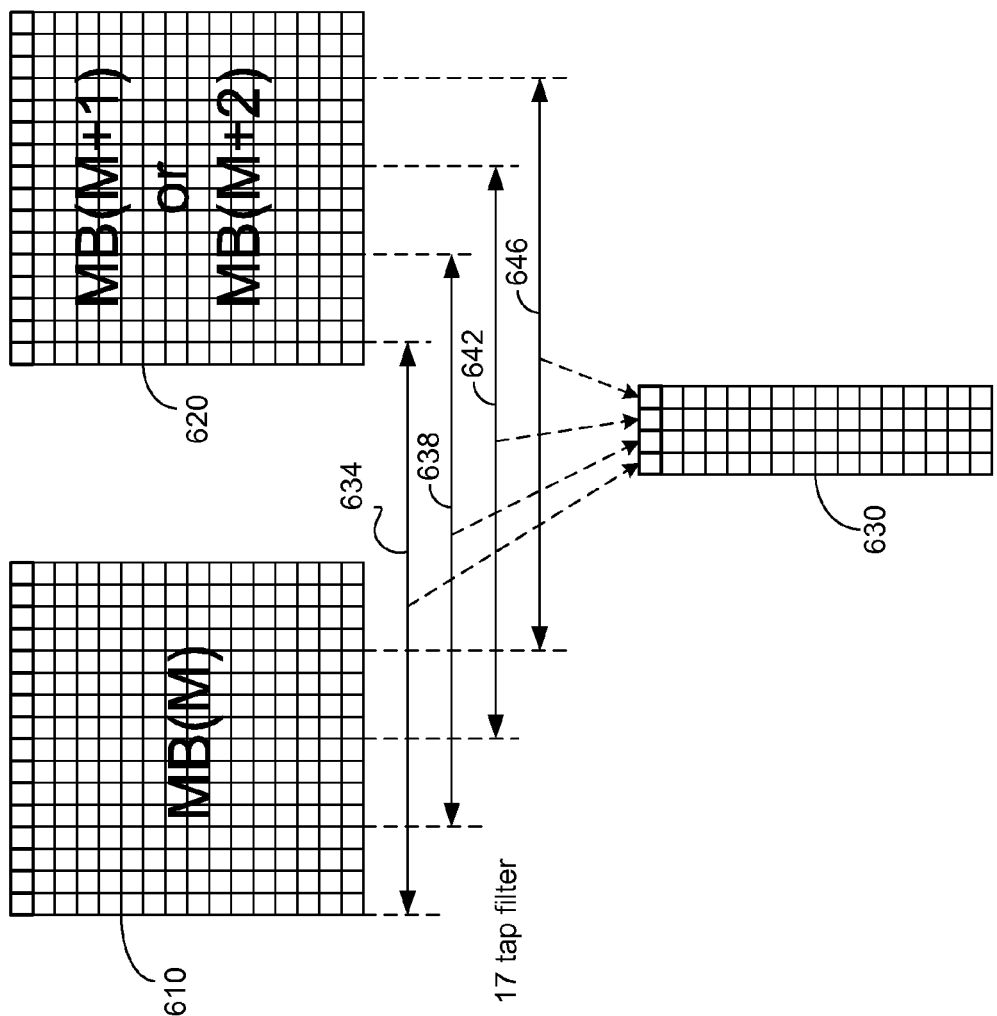
FIG. 6A is a diagram illustrating the process of horizontally downscaling macroblocks, according to one embodiment.
Figure 6B:
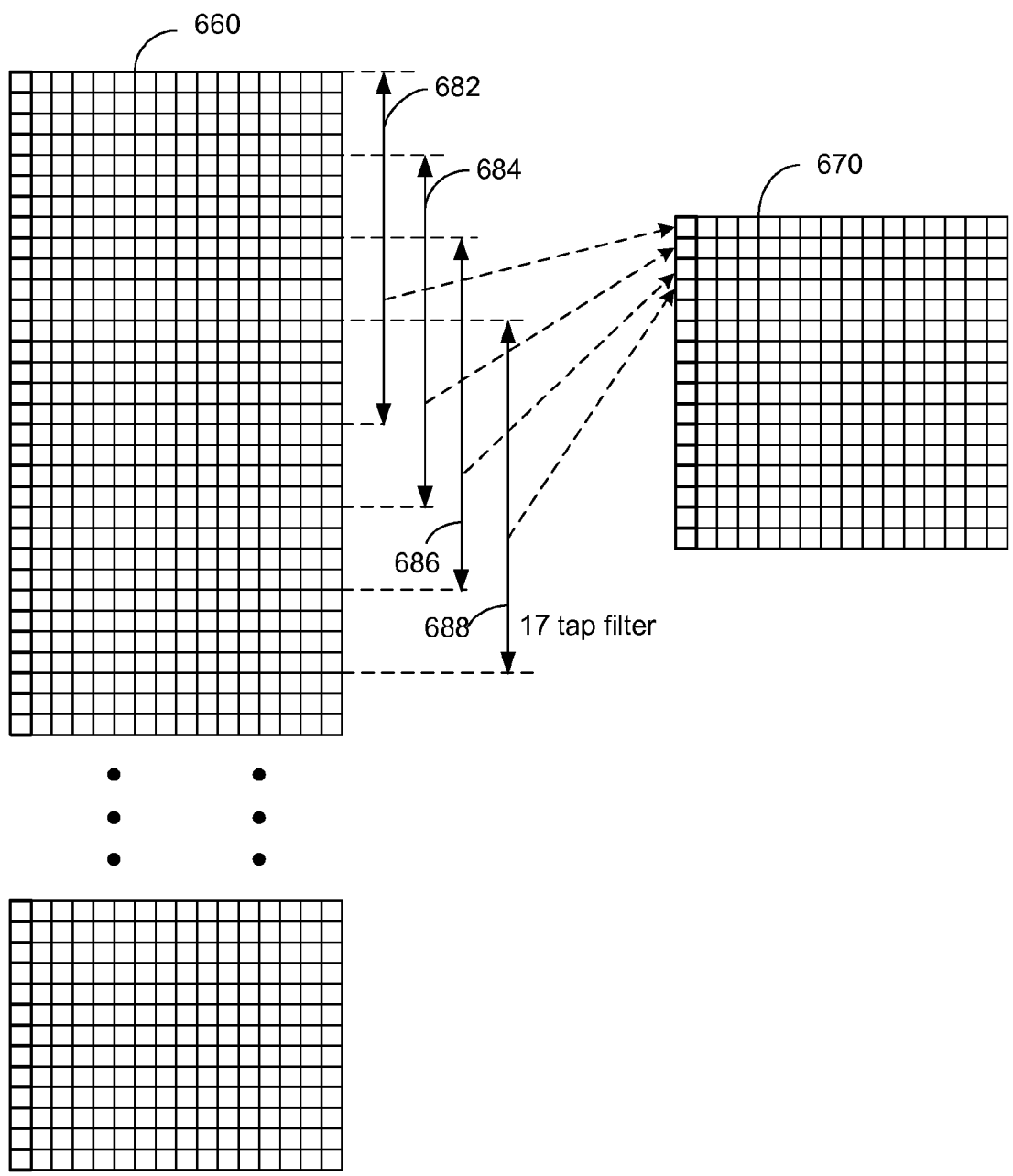
FIG. 6B is a diagram illustrating the process of vertically downscaling a block of pixels in an image, according to one embodiment.

In the following examples of downscaling, the macroblocks being processed are described with reference to luma macroblocks having a size of 16×16 pixels. The macroblocks, however, may be of an arbitrary size (size of m×n, where m and n are integers). The same process is also applicable to chroma macroblocks or macroblocks of different pixel sizes. FIGS. 6A and 6B illustrate examples where an original image is downscaled at a ratio of 4:1. This downscaling ratio is merely for the purpose of illustration and other downscaling ratios of N:1 (where N is any number larger than 1 and does not need to be an integer) may also be achieved using the same method described herein. Further, in the following examples, a 17-tap polyphase filter is used as an example of multi-tap polyphase filter for scaling the images. Different polyphase filters may also be used.

FIG. 6A illustrates using two horizontally adjacent macroblocks 610 and 620 to generate a sub-block 630 that is horizontally scaled down at a ratio of 4:1 from the macroblocks 610 and 620. One macroblock 610 is stored in the first input buffer of the horizontal scaler 210, and the other macroblock 620 is stored in the second input buffer of the horizontal scaler 210. The macroblocks stored in the first and the second input buffers differ depending on the format of the images being decoded. For example, if the decoded image is in a non-MBAFF format, the first macroblock 610 may be MB(M) and the second macroblock 620 may be MB(M+1) (refer to FIG. 5A). If the decoded image is in a MBAFF format, however, the first macroblock 610 may be a macroblock pair consisting of MB(M) and MB(M+1) and the second macroblock 620 may be a macroblock pair consisting of MB(M+2) and MB(M+3) (refer to FIG. 5B).

The 17-tap polyphase filter reads seventeen (17) pixels spanning from the macroblock 610 to the macroblock 620, as illustrated, for example, by arrows 634, 638, 642, 646. From each set of seventeen (17) pixels, one output pixel is generated that becomes a pixel of the scaled sub-block 630. Each row of pixels in the macroblock is sequentially processed by the 17-tap polyphase filter to generate each row in the scaled sub-block 630.

The pixel data for the sub-block 630 are then stored in the output buffer 330 of the horizontal scaler 210. If only horizontal downscaling is performed (without vertical downscaling), three more sub-blocks are generated to assemble a macroblock having the size of 16×16 pixels in the same manner using subsequent macroblocks from the decoder 120. The assembled macroblock is then sent to the encoder 160 via the bus 282 and the multiplexer 260 for encoding. Note that for non-integer scale ratios, the number of pixels contained in each sub-block 630 can vary from sub-block to sub-block.

If vertical downscaling also needs to be performed, the sub-block 630 is sent to the memory 190 for storage. FIG. 6B illustrates a block 660 of pixels retrieved by the vertical scaler 220 and stored in the input buffer 360 for vertical scaling. In this example where 4:1 downscaling is being performed, the block 660 has a size of 16×77 pixels. To generate macroblocks of different sizes, a different sized block of size R×P (where R and P are integers) may be retrieved. When a 17-tap polyphase filter is used for vertical scaling, seventeen (17) pixels in the vertical direction, as indicated, for example, by arrows 682, 684, 686, 688, are read into the 17-tap polyphase filter to generate one pixel that becomes part of the scaled macroblock block 670 from each group of seventeen (17) input pixels. The scaled macroblock 670 may then be sent over to the encoder 160 for encoding. After one vertical column of seventeen (17) pixels (e.g., indicated by the arrow 682) are scaled to produce one pixel (e.g., the pixel at the upper left corner of the macroblock 670), the process continues down to the next seventeen (17) pixels (e.g., indicated by the arrow 684) to generate the next pixel in the macroblock 670 below the pixel generated from the pixels indicated by the arrow 682 in the block 660. The process is repeated until all the pixels in the block 660 are used for generating the pixels in the macroblock 670. In the case of interlaced images, the input buffer 360 stores odd line luma pixels in its odd luma buffer 366 and even line luma pixels in its even luma buffer 368. The pixels stored in the odd luma buffer 366 and the pixels stored in the even luma buffer 368 are scaled separately by the vertical macroblock scaler 220 to prevent feathering of images due to mixing two different fields together. Likewise, the input chroma buffer 370 includes an odd chroma buffer 372 for storing odd line chroma pixels and an even chroma buffer 374 for storing even line chroma pixels.

Method of Horizontal Downscaling

Figure 7A:
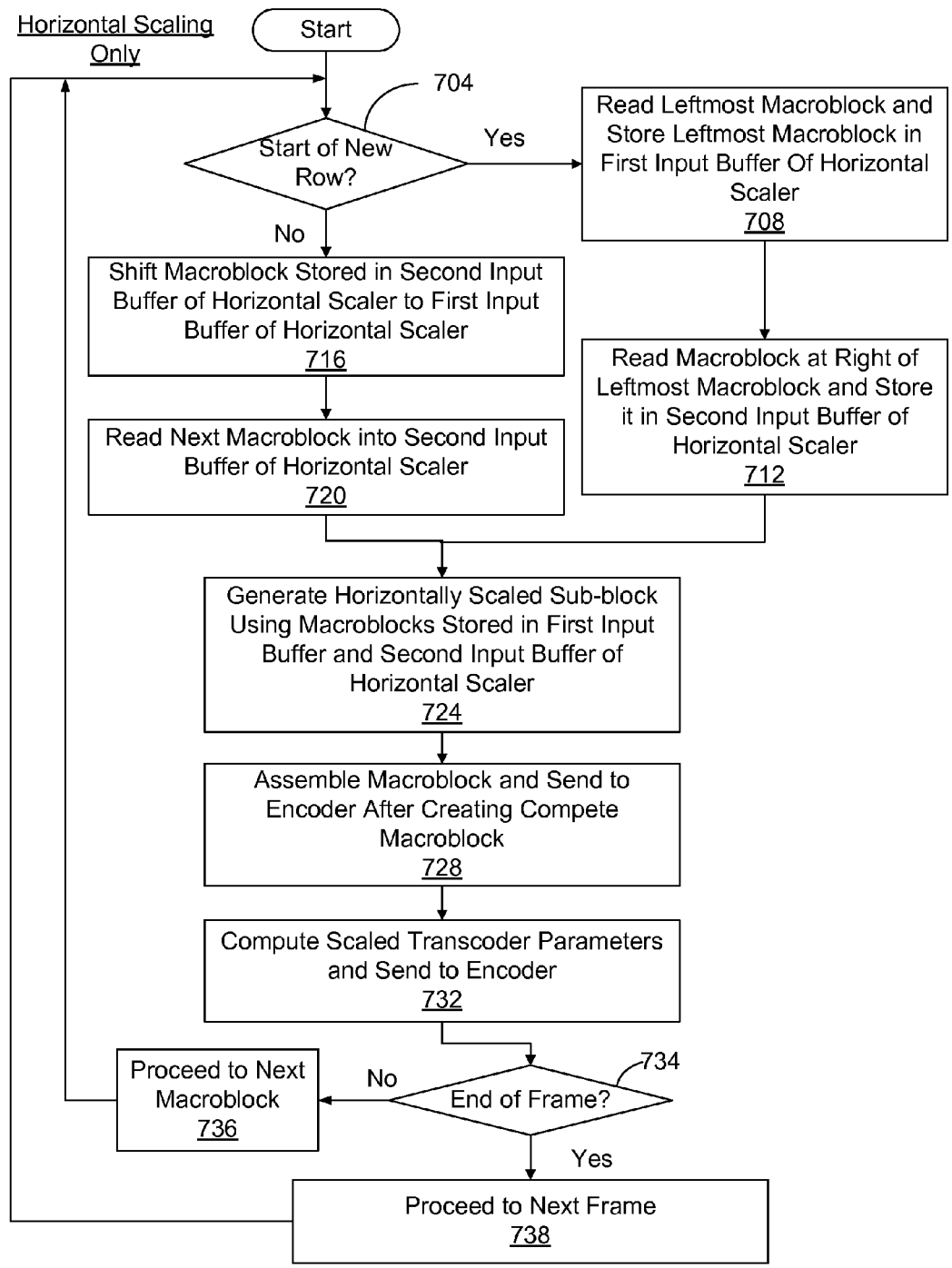
FIG. 7A is a flowchart illustrating a method of scaling an image in horizontal direction, according to one embodiment.

FIG. 7A is a flow chart illustrating a method of scaling the images only in horizontal direction. First, it is determined 704 whether a macroblock for a new horizontal row is received. If a new row has started, then the leftmost macroblock is read and stored 708 in the first buffer of the horizontal scaler 210. A macroblock at the right side of the leftmost macroblock is also read and stored 712 in the second buffer of the horizontal scaler 210.

If macroblock for the same line is already stored in the horizontal scaler 210 (i.e., not a start of a new horizontal row), then the macroblock stored in the second input buffer is shifted 716 to the first input buffer of the horizontal scaler 210. Then the next macroblock (i.e., macroblock at the right side of the macroblock shifted to the second input buffer) is read and stored 720 into the first input buffer of the horizontal scaler 210.

After reading the macroblock into the second input buffer (step 712 or 720), a horizontally scaled sub-block 630 is generated 724 by feeding the pixel data into the multi-tap polyphase filter 328. The horizontally scaled sub-block 630 is then assembled 728 into a macroblock having the size of 16×16 pixels and sent 728 to the encoder 160 after creating an output macroblock. The scaled transcoder parameters are computed 732 at the TP scaler 230 and are sent to the encoder 160 after computing a complete set of transcoder parameters. Then it is determined 734 if the end of a frame is reached. If the end of a frame is not reached, then the process proceeds to the next macroblock 736 and returns to the step 704. If the end of a frame is reached, then the scaling process proceeds 738 to the next frame and then returns to the step 704.

Note that for MBAFF, the horizontal scaler will operate on macroblock pairs rather than single macroblocks.

Method of Downscaling

Figure 7B:
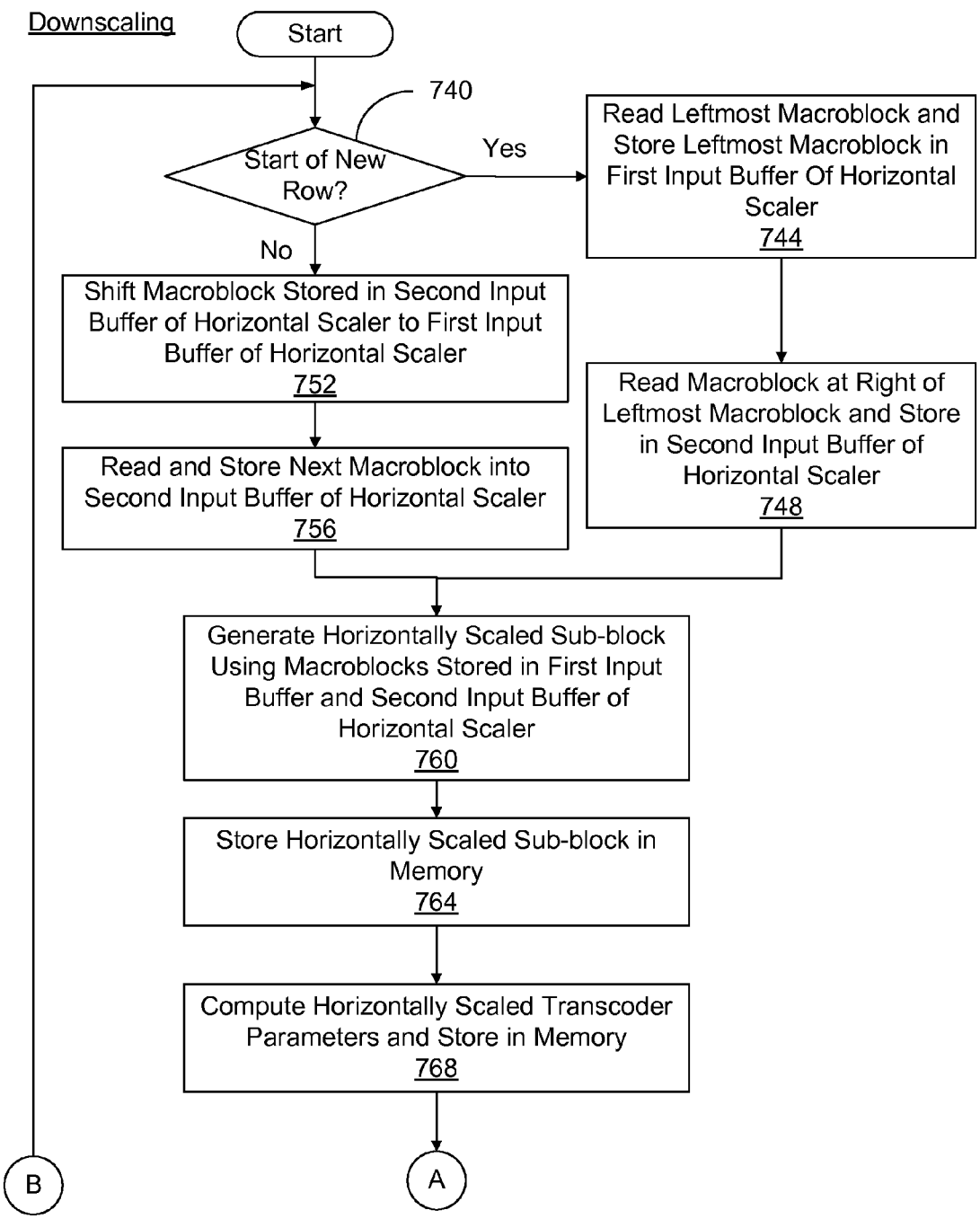
FIGS. 7B and 7C are flowcharts illustrating a method of downscaling an image in horizontal direction and vertical direction, according to one embodiment.
Figure 7C:
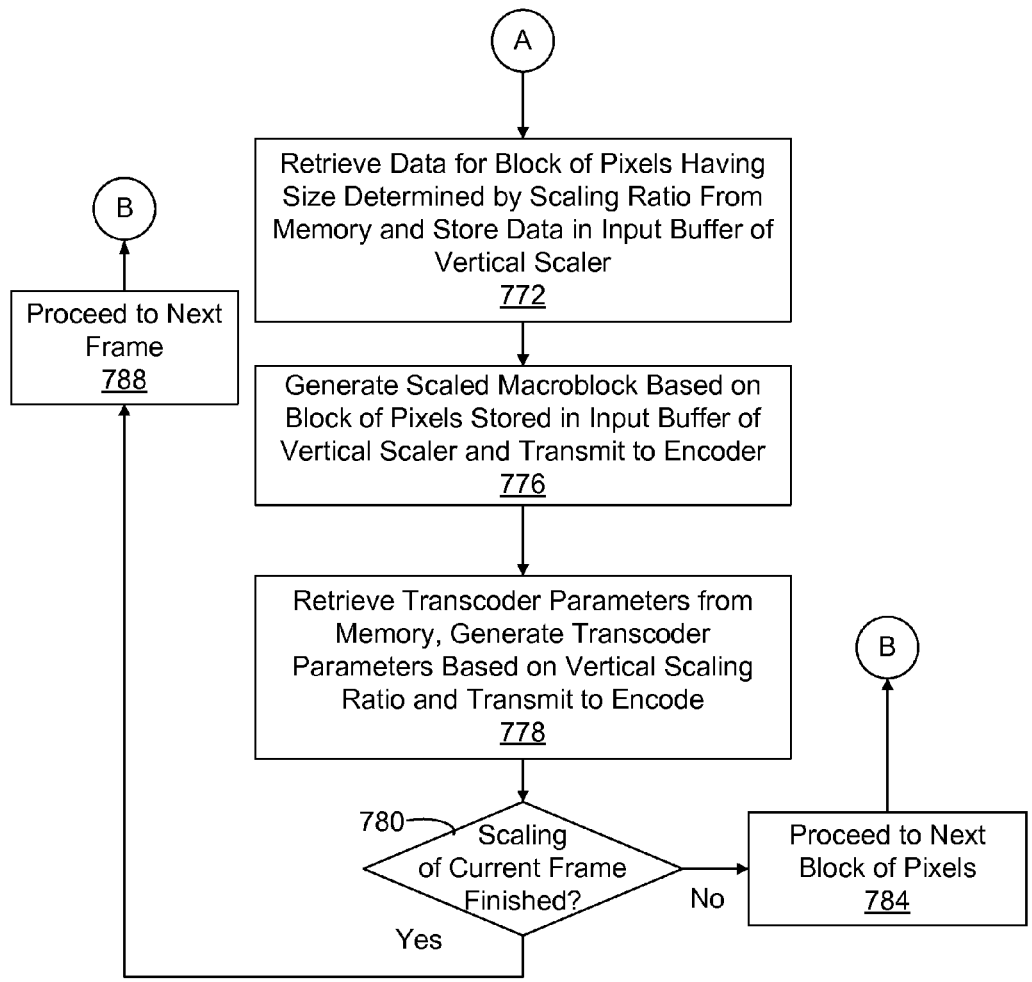

FIGS. 7B and 7C are flowcharts illustrating a method of downscaling an image in horizontal direction and vertical direction, according to one embodiment. In this embodiment, horizontal scaling is followed by vertical scaling. Steps 740 to 760 are essentially the same as steps 704 to 724 for performing the horizontal scaling only, as described above in detail with reference to FIG. 7A. Specifically, it determines 740 whether macroblocks for a new horizontal row are received. If a new row has started, then leftmost macroblock is read and stored 744 in the first buffer of the horizontal scaler 210. A macroblock at the right side of the leftmost macroblock is also read and stored 748 in the second buffer of the horizontal scaler 210. If macroblock for the same row is already available (i.e., not the start of a new horizontal row), the macroblock stored in the second input buffer is shifted 752 to the first input buffer of the horizontal scaler 210. Then the next macroblock (i.e., macroblock at the right side of the macroblock shifted to the second input buffer) is read and stored 756 into the first input buffer of the horizontal scaler 210.

After reading the macroblock into the second input buffer (step 748 or 756), a horizontally scaled sub-block 630 is generated 760 by feeding the pixel data into the multi-tap polyphase filter 328. The horizontally scaled sub-block 630 is then stored 764 in the memory 190 when a complete macroblock is ready. The horizontally scaled transcoder parameters 234 are computed 768 at the TP scaler 230 and are sent to the memory 190 after computing a complete transcoder parameter set.

Then the vertical scaler 220 retrieves 772 pixel data for a block of pixels determined by the scaling ratio. For example, when 4:1 horizontal downscaling is being performed, the size the block of pixels is 16×77, as described above in detail with reference to FIG. 6B. In one embodiment, the number of pixels retrieved by the vertical scaler 220 is the minimum number of pixels needed to generate a scaled macroblock 670 having a size of, for example, 16×16 pixels. Then the scaled macroblock is generated 776 by providing pixel data to the multi-tap polyphase filter 378 of the vertical scaler 220 and passed either to memory or to the encoder. The horizontally scaled transcoder parameters 236 are read from the memory 190, vertically scaled 778 by the TP scaler 230. The vertically scaled transcoder parameter set 232 is passed to the encoder. The process determines 780 whether scaling of the current frame is finished. If the scaling of the current frame is not finished, the process proceeds to the next block of pixels 784 and returns to step 772. On the other hand, if the scaling of the current frame is finished, the process proceeds 788 to the next frame and returns to step 740.

As stated earlier, for MBAFF, the horizontal scaler will operate on macroblock pairs rather than single macroblocks.

Upscaling Example

Figure 8:
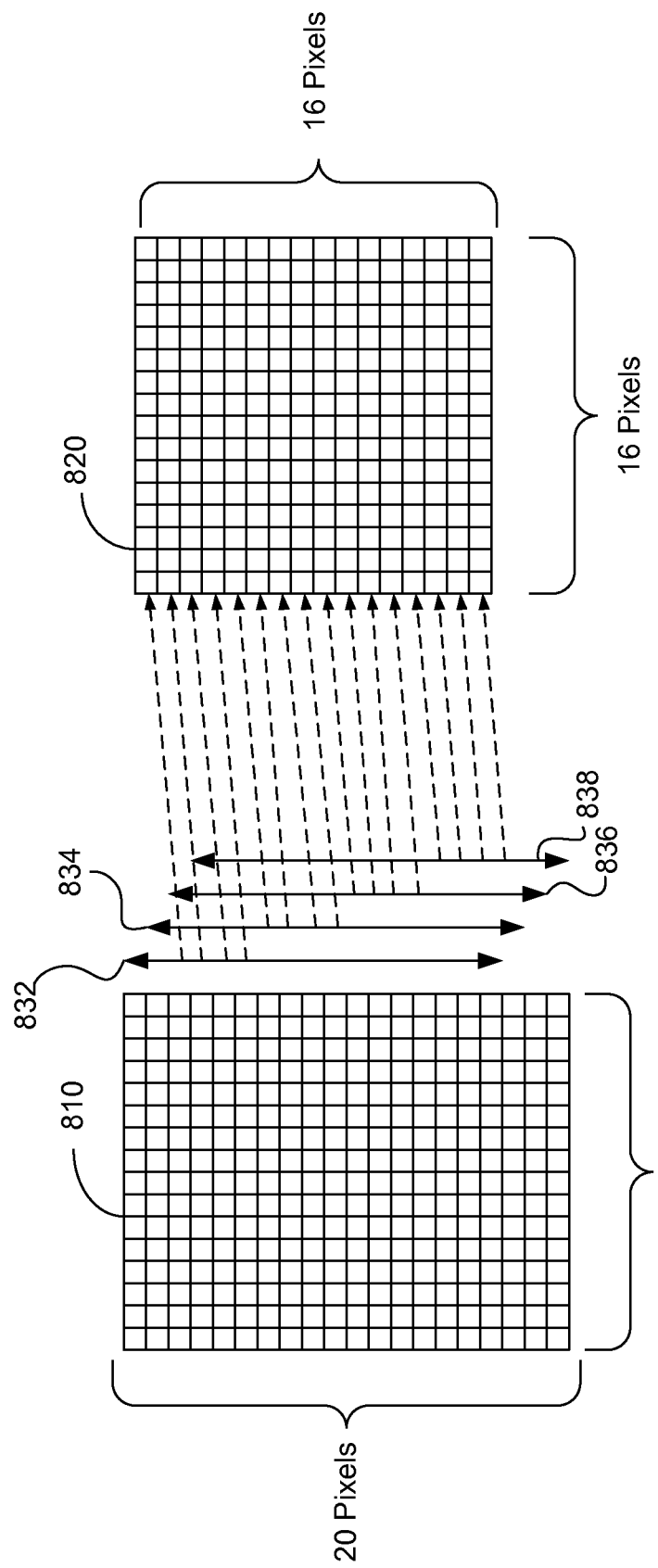
FIG. 8 is a diagram illustrating the process of vertically upscaling an image, according to one embodiment.
Figure 9:
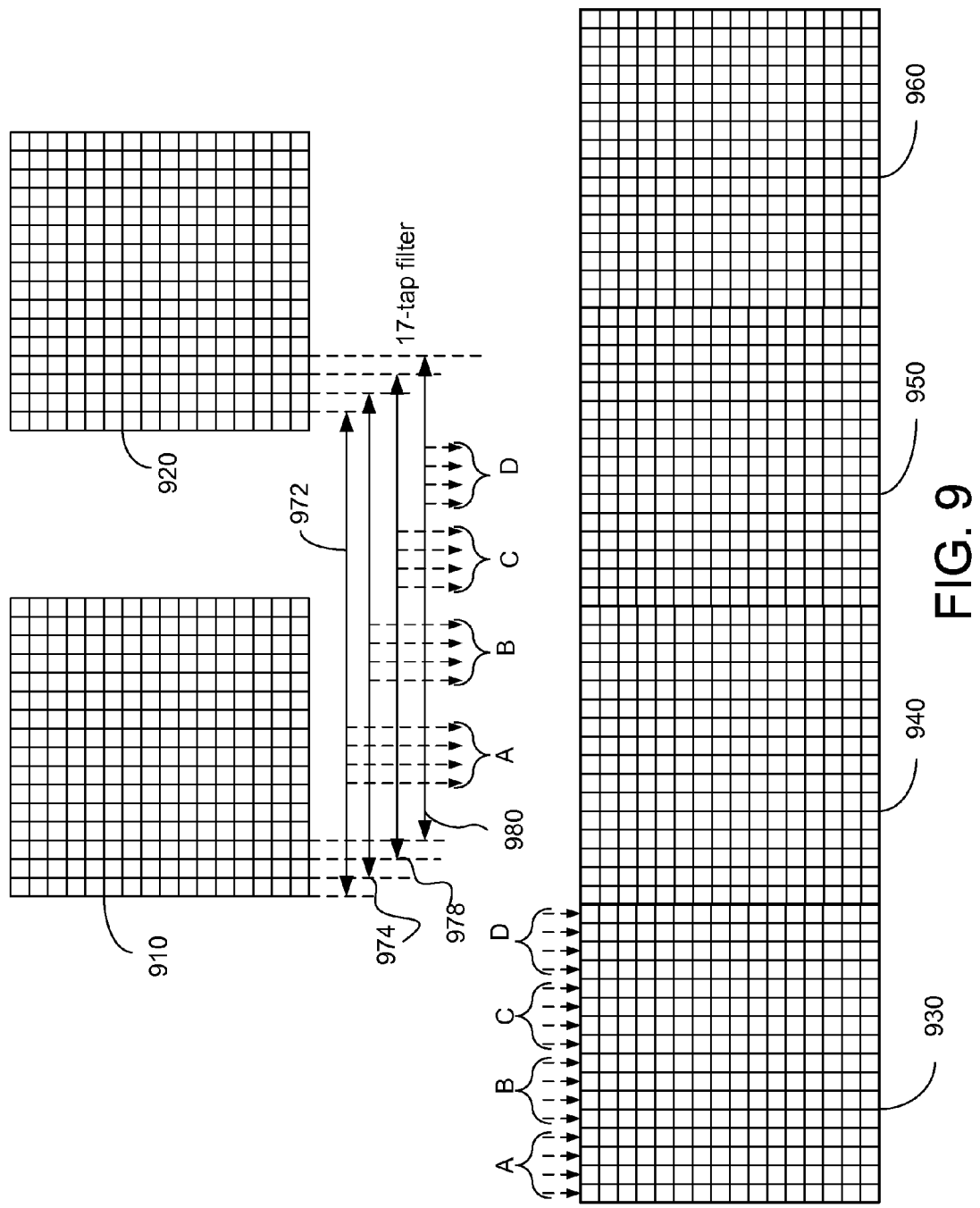
FIG. 9 is a diagram illustrating the process of horizontally upscaling an image, according to one embodiment.

An example of upscaling an image four times vertically and four times horizontally is described below. FIGS. 8 and 9 illustrate examples where an original image is upscale at a ratio of 1:4. Different upscaling ratio of 1:N (where N is any number larger than 1 and does not need to be an integer) may also be used. Although the following example is described with reference to luma macroblocks, the same process may be applied to chroma macroblocks. Further, the example set forth below uses a 17-tap polyphase filter. Different filters (e.g., 4-tap or 6-tap) may be used. Also, in the following upscaling example, the macroblock generated is of size 16×16 although macroblocks of an arbitrary size (size of m×n, where m and n are integers) may be used.

When upscaling, the vertical scaling is first performed followed by the horizontal scaling to reduce the memory bandwidth for the vertical scaler. FIG. 8 is a diagram illustrating a method of vertically upscaling a block 810 of pixels in the vertical scaler 220, according to one embodiment. First, a block 810 of pixels having a size of 16×20 pixels are read into the input buffer 360 of the vertical scaler 220. For macroblocks of different sizes, blocks of different sizes may be read into the input buffer 360. As indicated, for example, by arrows 832, 834, 836, 838, seventeen (17) vertical pixels are fed into the 17-tap polyphase filter. The 17-tap polyphase filter generates four (4) pixels for each set of seventeen (17) pixels. Therefore, a vertically scaled macroblock 820 having a size of 16×16 pixels are generated from the block 810 of pixels as illustrated in FIG. 8. After the vertically scaled macroblock 820 is generated, the macroblock 820 is fed to the horizontal scaler 210 for horizontal scaling.

FIG. 9 illustrates horizontally upscaling the vertically scaled macroblocks 820 generated by the vertical scaler 210. Specifically, two consecutive macroblocks 910, 920 from the vertical scaler 210 are fed into the input buffer 310 of the horizontal scaler 210. The macroblocks 910, 920 represent horizontally adjacent blocks of pixels as generated by the vertical scaler 210. Seventeen (17) horizontally consecutive pixels spanning from the macroblock 910 to the macroblock 920 are fed into the 17-tap polyphase filter to generate horizontally scaled pixels as represented by four macroblocks 930, 940, 950, 960. The first outputs A from the 17-tap polyphase based on the first four inputs of seventeen (17) pixels (indicated by arrow 972) become the first set of four pixels of the scaled macroblock 930. The second outputs B from the 17-tap polyphase based on the second four inputs of seventeen (17) pixels (indicated by arrow 974) become the second set of four pixels of the horizontally scaled macroblock 930. The third outputs C from the 17-tap polyphase based on the third four inputs of seventeen (17) pixels become the third set of four pixels of the horizontally scaled macroblock 930. The fourth outputs D from the 17-tap polyphase based on the first four inputs of seventeen (17) pixels become the fourth set of four pixels of the horizontally scaled macroblock 930. The process is repeated until all the pixels in the macroblocks 910, 920 are used by the 17-tap polyphase filter to generate the scaled macroblocks 930, 940, 950, 960.

After all sets of seventeen (17) pixels are processed by the 17-tap filter, four vertically and horizontally scaled macroblocks 930, 940, 950, 960 are generated and stored in the output buffer 330 of the horizontal scaler 210. These four scaled macroblocks 930, 940, 950, 960 are then sequentially sent to the encoder 160 for encoding.

Note that for MBAFF, the horizontal scaler will operate on macroblock pairs rather than single macroblocks.

Method of Upscaling

Figure 10A:
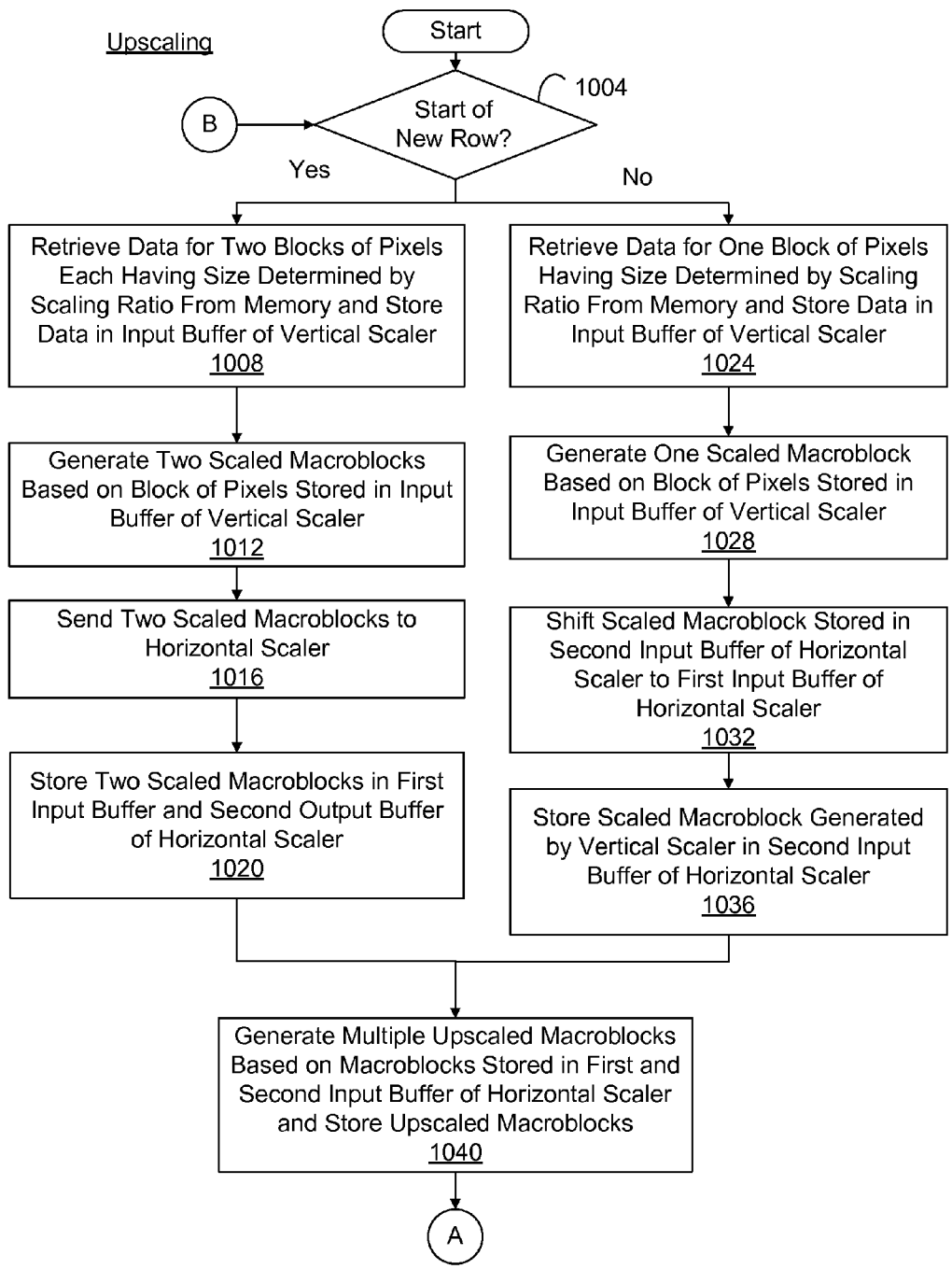
FIGS. 10A and 10B are flow charts illustrating the method of upscaling an image, according to one embodiment.
Figure 10B:
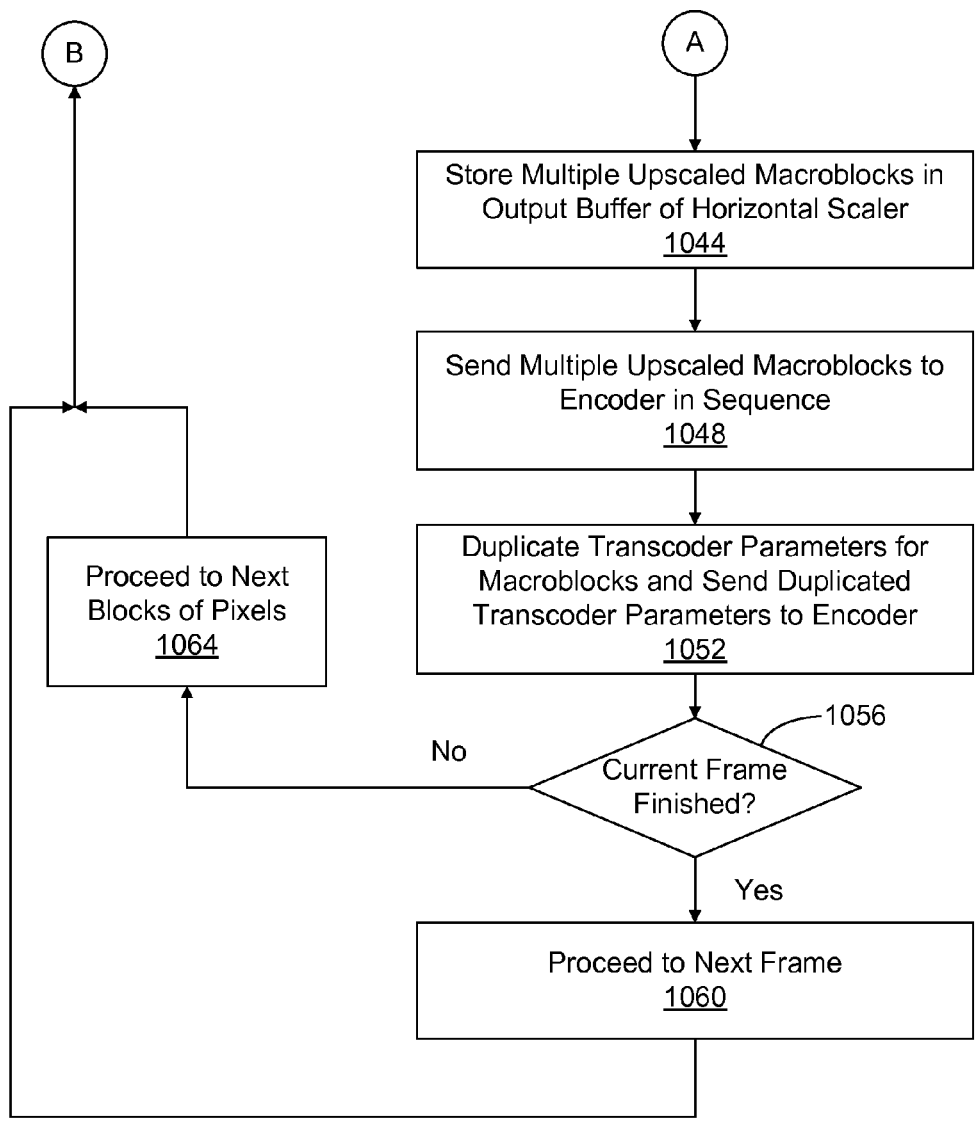

FIGS. 10A and 10B are flow charts illustrating the method of upscaling the images, according to one embodiment. First, it is determined 1004 whether the macroblock received at the scaler 140 represent a macroblock of a new horizontal row (i.e., the received macroblock is the leftmost macroblock). If, for example, it is determined that a new horizontal row has started, then the two horizontally consecutive blocks of pixels having a size determined by the scaling ratio are retrieved 1008 from the memory 190 and stored in the input buffer 360 of the vertical scaler 220. If the ratio of upscaling is 1:4, the size of the block is 16×20, as described above in detail with reference to FIG. 8. Based on the two blocks of pixels, two vertically scaled macroblocks are generated 1012 by the vertical scaler 220. The two scaled macroblocks are then sent 1016 to the horizontal scaler 210. The horizontal scaler 210 stores 1020 the two vertically scaled macroblocks in its input buffer 310.

If it is determined that a new horizontal row has not started, only one block of pixels having the size determined by the scaling ratio is retrieved 1024 from the memory 190 into the input buffer 360 of the vertical scaler 220. The vertical scaler 220 then generates 1028 one vertically scaled macroblock based on the block of pixels stored in the input buffer 360. Because this is not a new horizontal row, the horizontal scaler 210 already has two vertically scaled macroblocks stored in its input buffer 310. Specifically, referring to FIG. 9, the first input buffer of the horizontal scaler 210 stores the vertically scaled macroblock 910 and the second input buffer of the horizontal scaler 210 stores vertically scaled macroblock 920 at the right side of the macroblock 910. The macroblock stored in the second input buffer of the horizontal scaler 210 is shifted 1032 to the first input buffer. Then the vertically scaled macroblock generated by the vertical scaler 220 in the current cycle is stored in the second input buffer of the horizontal scaler 210.

After either the step 1020 or 1036, multiple upscaled macroblocks (e.g., macroblocks 930 through 960 of FIG. 9) are generated 1040 by the horizontal scaler 210. The multiple upscaled macroblocks are then stored 1044 in the output buffer 330 of the horizontal scaler 210. The multiple upscaled macroblocks are then sent 1048 to the encoder 160 sequentially. The transcoder parameters are also duplicated 1052 at the TP scaler 230, as described above in detail with reference to FIG. 4. Then it is determined 1056 whether the current frame is finished. If the current frame is not finished, then the process proceeds 1064 to the next blocks of pixels and returns to the step 1004. On the other hand, if the scaling of the current frame is finished, then the process proceeds 1060 to the next frame, and returns to the step 1004.

Note that for MBAFF, the horizontal scaler will operate on macroblock pairs rather than single macroblocks.

Alternative Embodiments

In one embodiment, anamorphic scaling is performed by generating different number of pixels for the same number of input pixels at the horizontal scaler 210. In anamorphic scaling, pixels at different locations are scaled at different ratios. By keeping track of the location of the macroblock within the horizontal line, the horizontal scaler 210 can, for example, scale at a higher upscaling ratio at or near the left or right edges of the image while upscaling at a lower upscaling ratio near the center of the horizontal line.

In one embodiment, the vertical scaling is accomplished by dropping even or odd lines in the interlaced image instead of using a multi-tap polyphase filter. By dropping all the information of even or odd lines of macroblocks, a downscaling of 2:1 can be achieved without performing filtering process by multi-tap filters. In this method no memory bandwidth is needed to perform the downscaling. The horizontal scaling does not require any memory bandwidths. Therefore, the scaling can be performed without using up any memory bandwidths.

In one embodiment, YUV format conversion is performed during the scaling process by scaling the luma and chroma at different scaling ratios. Specifically, by setting the luma vertical scaling ratio to 1:1 and chroma vertical downscaling ratio to 2:1 the chroma data may be modified so that the YUV format (e.g., YUV 4:2:2 and YUV 4:2:0) of the scaled macroblocks is changed.

As noted in some of the embodiments above, they may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, b oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

The macroblock based scaling disclosed herein reduces the memory bandwidths required to perform scaling. Therefore, the overall process of transcoding may become faster and more efficient. Furthermore, scaling of transcoder parameters at the scaler eliminates the need to perform such processes as motion estimation at the encoder, which enhances the efficiency of the transcoding processes. Further, other image processing processes such as YUV format conversion may be performed during the scaling process.

Upon reading this disclosure, those of skill in the art will appreciate still additional alternative structural and functional designs for a system and a process for scaling the image through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of scaling resolution of an image, comprising:
responsive to receiving first input pixel data for upscaling vertically and horizontally:
storing the first input pixel data in a memory;
sending a block of pixels of the first input pixel data from the memory to a vertical scaler;
generating, at the vertical scaler, first scaled pixel data representing the block of pixels upscaled vertically compared to the block of pixels;
receiving, at a horizontal scaler via a first input of a multiplexer, two or more macroblocks of the first scaled pixel data from the vertical scaler without storing the first scaled pixel data in the memory;
generating second scaled pixel data by filtering pixel data for a plurality of pixels spanning across the two or more macroblocks of the first scaled pixel data at a scaling filter in the horizontal scaler, the second scaled pixel data representing a block of pixels upscaled horizontally compared to the two or more macroblocks of the first scaled pixel data; and
generating a vertically and horizontally upscaled version of the image based on the second scaled pixel data; and
responsive to receiving second input pixel data for horizontal scaling without vertical scaling:
receiving, at the horizontal scaler via a second input of the multiplexer, two or more macroblocks of the second input pixel data;
generating third scaled pixel data by filtering pixel data for a plurality of pixel data spanning across the two or more macroblocks of the second input pixel data, the third scaled pixel data representing a block of pixels scaled horizontally compared to the two or more macroblocks of the second input pixel data; and
generating a horizontally scaled version of the image based on the third scaled pixel data.

2. The method of claim 1, wherein the vertical scaler accesses the memory to generate the first scaled pixel data.

3. The method of claim 1, further comprising:
receiving transcoder parameters from a decoder for decoding a compressed image;
generating scaled transcoder parameters by converting or duplicating the received transcoder parameters; and
sending the scaled transcoder parameters to an encoder for encoding the vertically and horizontally upscaled version of the image or the horizontally scaled version of the image.

4. The method of claim 1, wherein the scaling filter comprises a 17-tap polyphase filter.

5. The method of claim 1, further comprising:
responsive to receiving third input pixel data for downscaling vertically and horizontally:
receiving a block of pixels of the third input pixel data at the horizontal scaler via the multiplexer;
generating, at the horizontal scaler, fourth scaled pixel data representing a block of pixels downscaled horizontally compared to the block of pixels of the third input pixel data;
storing the fourth scaled pixel data in the memory;
sending the fourth scaled pixel data from the memory to the vertical scaler;
generating fifth scaled pixel data at the vertical scaler, the fifth scaled pixel data representing a block of pixels downscaled vertically compared to the fourth scaled pixel data; and
generating a vertically and horizontally downscaled version of the image based on the fifth scaled pixel data.

6. The method of claim 5, wherein the first input pixel data and the fourth scaled pixel data are sent to the memory for storage via another multiplexer.

7. The method of claim 5, further comprising generating the first input pixel data, the second input pixel data and the third input pixel data at a decoder by decoding an input stream.

8. A scaler for scaling an image, the scaler comprising:
a memory and a processor, the processor comprising: a vertical scaler configured to generate first scaled pixel data representing a block of pixels upscaled vertically compared to first input pixel data for upscaling vertically and horizontally;
a multiplexer having at least a first input and a second input, the first input configured to receive the first scaled pixel data, the second input configured to receive second input pixel data for horizontal scaling without vertical scaling; and
a horizontal scaler coupled to the multiplexer and comprising:
an input buffer configured to receive two or more macroblocks of the first scaled pixel data via the multiplexer without storing the first scaled pixel data in the memory separate from the horizontal scaler and the vertical scaler, the input buffer further configured to receive two or more macroblocks of the second input pixel data via the multiplexer,
a scaling filter configured to generate second scaled pixel data by filtering pixel data for a plurality of pixels spanning across the two or more macroblocks of the first scaled pixel data, the second scaled pixel data representing a block of pixels horizontally upscaled compared to the two or more macroblocks of the first scaled pixel data, the scaling filter further configured to generate third scaled pixel data by filtering pixel data for a plurality of pixels spanning across the two or more macroblocks of the second input pixel data, and
an output buffer configured to store the second scaled pixel data or the third scaled pixel data.

9. The scaler of claim 8, wherein the vertical scaler accesses the memory during generation of the first scaled pixel data.

10. The scaler of claim 8, wherein the scaling filter comprises a 17-tap polyphase filter.

11. The scaler of claim 8, wherein the horizontal scaler is further configured to receive a block of pixels of third input pixel data for downscaling vertically and horizontally and generate fourth scaled pixel data representing a block of pixels downscaled horizontally compared to the block of pixels of the third input pixel data, and wherein the vertical scaler is further configured to generate fifth scaled pixel data representing a block of pixels downscaled vertically compared to the fourth scaled pixel data.

12. The scaler of claim 11, further comprising another multiplexer configured to send the first input pixel data and the fourth scaled pixel data to the memory for storage.

13. The method of claim 11, further comprising a decoder for decoding an input stream into the second input pixel data or the third input pixel data.

14. A transcoder system for converting an image in a first format to a second format, comprising:
a memory and a processor, the processor comprising: a decoder configured to decode the image in the first format and outputting a sequence of a first decoded macroblocks for upscaling vertically and horizontally or second decoded macroblocks for horizontal scaling without vertical scaling;
a scaler comprising:
a vertical scaler configured to generate first scaled pixel data representing a block of pixels upscaled vertically compared to the first decoded macroblocks;
a multiplexer having at least a first input and a second input, the first input configured to receive the first scaled pixel data, the second input configured to receive the second decoded macroblocks;
a horizontal scaler coupled to the multiplexer and comprising:
an input buffer configured to receive two or more macroblocks of the first scaled pixel data via the multiplexer without storing the first scaled pixel data in the memory separate from the horizontal scaler and the vertical scaler, the input buffer further configured to receive two or more macroblocks of the second decoded macroblocks via the multiplexer,
a scaling filter configured to generate second scaled pixel data by filtering pixel data for a plurality of pixels spanning across the two or more macroblocks of the first scaled pixel data, the second scaled pixel data representing a block of pixels horizontally upscaled compared to the two or more macroblocks of the first scaled pixel data, the scaling filter further configured to generate third scaled pixel data by filtering pixel data for a plurality of pixels spanning across the two or more macroblocks of the second decoded macroblocks, and
an output buffer configured to store the second scaled pixel data or the third scaled pixel data; and
an encoder configured to receive the second scaled pixel data or the third scaled pixel data and encode the second scaled pixel data or the third scaled pixel data into a transcoded image in the second format.

15. The transcoder system of claim 14, wherein the scaler converts or duplicates transcoder parameters received from the decoder, the converted or duplicated transcoder parameters sent to the encoder.

16. The transcoder system of claim 14, wherein the vertical scaler is configured to access the memory to generate the first scaled pixel data.

17. The transcoder system of claim 14, wherein the scaler performs YUV format conversion.

18. The transcoder system of claim 14, wherein the scaling filter comprises a 17-tap polyphase filter.

19. The transcoder system of claim 14, wherein the scaler is configured to send the second scaled pixel data or the third scaled pixel data according to the sequence as encoded by the encoder.

* * * * *